(12) United States Patent
Fowler et al.

(10) Patent No.: US 9,715,602 B1
(45) Date of Patent: Jul. 25, 2017

(54) SYSTEM AUTHENTICATING TICKETHOLDER AT RE-ENTRY

(71) Applicant: CONDUENT BUSINESS SERVICES, LLC, Dallas, TX (US)

(72) Inventors: Jeffrey M. Fowler, Rochester, NY (US); Aaron M. Stuckey, Fairport, NY (US)

(73) Assignee: Conduent Business Services, LLC, Dallas, TX (US)

( * ) Notice: Subject to any disclaimer, the term of this patent is extended or adjusted under 35 U.S.C. 154(b) by 8 days.

(21) Appl. No.: 15/073,790

(22) Filed: Mar. 18, 2016

(51) Int. Cl.
*G06K 5/00* (2006.01)
*G06K 1/12* (2006.01)
*G06K 7/10* (2006.01)
*G06K 9/00* (2006.01)

(52) U.S. Cl.
CPC ......... *G06K 1/121* (2013.01); *G06K 7/10722* (2013.01); *G06K 9/00288* (2013.01)

(58) Field of Classification Search
CPC ... G06K 1/121; G06K 7/0722; G06K 9/00288
See application file for complete search history.

(56) References Cited

U.S. PATENT DOCUMENTS

| 5,638,302 | A | 6/1997 | Gerber | |
| 5,640,002 | A * | 6/1997 | Ruppert | 235/472 |
| 6,812,509 | B2 | 11/2004 | Xu | |
| 6,848,617 | B1 | 2/2005 | Fries et al. | |
| 7,155,416 | B2 | 12/2006 | Shatford | |
| 7,798,404 | B2 | 9/2010 | Gelbman | |
| 7,885,763 | B2 | 2/2011 | Havens | |
| 8,636,206 | B2 | 1/2014 | Rothwell et al. | |
| 2001/0018660 | A1 * | 8/2001 | Sehr | G06Q 10/02 705/5 |
| 2002/0116343 | A1 * | 8/2002 | Nakamura | G06Q 10/02 705/65 |
| 2004/0050625 | A1 | 3/2004 | Van Der Valk | |
| 2004/0104097 | A1 * | 6/2004 | Ngee | G06Q 20/02 194/210 |
| 2007/0218968 | A1 | 9/2007 | Snow et al. | |
| 2008/0005578 | A1 | 1/2008 | Shafir | |

(Continued)

*Primary Examiner* — Christle I Marshall
*Assistant Examiner* — Asifa Habib
(74) *Attorney, Agent, or Firm* — Gibb & Riley, LLC

(57) ABSTRACT

During admission to a location, a machine reader optically reads original machine-readable data on an original admission ticket and stores an original code based on the original machine-readable data and original user-specific information in re-writeable electronic memory on the original admission ticket while the original user is entering the location. The original user is then provided initial entry to the location. After the initial entry, a potential admission ticket is received at the location from a potential user. The machine reader optically reads potential machine-readable data on the potential admission ticket at the location, and the machine reader compares a potential code based on the potential machine-readable data and potential user-specific information to the original code stored in the re-writeable electronic memory on the original admission ticket. The potential user is provided re-entry to the location only if the potential code matches the original code.

20 Claims, 6 Drawing Sheets

(56) References Cited

U.S. PATENT DOCUMENTS

2010/0070312 A1\* 3/2010 Hunt .................. G06Q 10/02
705/5
2013/0112755 A1\* 5/2013 Allen ................ G06K 19/067
235/492

\* cited by examiner

SYSTEM AUTHENTICATING TICKETHOLDER AT RE-ENTRY

BACKGROUND

Systems and methods herein generally relate to systems that admit ticketholders to events and more particularly to systems that control re-entry into the event using a previously processed admission ticket.

Ticketed events and attractions with re-entry privileges or multiple venues, including sports, theater, conferences, conventions, expositions, festivals, fairs, parties, and theme parks, need to control re-entry in a way that prevents reuse of tickets by more than the original attendee. Current approaches include hand stamps, wristbands, a priori personalization (e.g. names printed on tickets checked against ID) and ad hoc personalization by synchronization with a central database. Each alternative comes with an array of advantages and disadvantages relating to materials cost, infrastructure cost, effectiveness, throughput, situational appropriateness, and flexibility.

SUMMARY

Exemplary methods herein create an original admission ticket that includes printed machine-readable data and a printed re-writeable electronic memory using at least one printing device. Subsequently, such methods issue the original admission ticket for admission to a location where an event is occurring, and such methods receive the original admission ticket at the location from an original user who desires admission to the event.

These methods optically read original machine-readable data printed on the original admission ticket using a machine reader at the location. Additionally, such methods obtain original user-specific information from the original user while the original user is entering the location. Then, such methods electronically store an original code that is based on the original machine-readable data and the original user-specific information in the re-writeable electronic memory on the original admission ticket using the machine reader while the original user is entering the location. The process of storing the original code in the re-writeable electronic memory on the original admission ticket can include an integrated or separate process of applying the original machine-readable data and original user-specific information to a hash function to calculate the original code and/or otherwise encrypting the original machine-readable data and the original user-specific information before storing the original code in the re-writeable electronic memory on the original admission ticket.

After the storing the original code in the re-writeable electronic memory on the original admission ticket, these methods provide the original user initial entry to the location. These methods can physically alter the original admission ticket before providing the original user initial entry to the location to indicate that the original admission ticket has been used to gain initial entry.

At some time after the initial entry, the original user may want to renter using the original admission ticket; however, the identity of the original user and the authenticity of the original admission ticket need to be verified. Therefore, such methods receive the admission ticket that is submitted for re-entry at the location as a "potential" admission ticket until it is verified, and from the user who is also classified as a "potential" user until they are verified.

In such processing, these methods optically read potential machine-readable data on the potential admission ticket using the machine reader at the location, and obtain potential user-specific information from the potential user while the potential user is entering the location. The original user-specific information and the potential user-specific information can be information from documents supplied by the original and potential users while they were at the location input to the machine reader, physical descriptions of the original and potential users obtained while the original user were at the location input to the machine reader, biometric information of the original and potential users obtained by the machine reader while the users were at the location, photographs of the original and potential users obtained by the machine reader while they were at the location, etc.

This allows the methods to compare a potential code based on the potential machine-readable data and the potential user-specific information to the original code stored in the re-writeable electronic memory on the original admission ticket using the machine reader while the potential user is entering the location. A match between the original code and the potential code determines if the original user and the potential user are the same and if the original admission ticket and the potential admission ticket are the same. Thus, such methods provide the potential user re-entry to the location only if the potential code matches the original code.

Various exemplary systems herein include (among other components) at least one printing device creating an original admission ticket that includes printed machine-readable data and a printed re-writeable electronic memory. The original admission ticket is issued for user admission to an event at a location, and after issuance, the original admission ticket is received at the location from an original user for admission into the event.

A machine reader is included in the system (at the location) for optically reading (scanning) the original machine-readable data on the original admission ticket and is operated by an automated or manual entry gate agent to allow the user to gain admission to the location. The machine reader can be portable and can include (among other components) a processor, a memory, a user interface, a scanner (optically reading the machine-readable data, etc.), biometric readers, a camera, wireless and wired communication components, a self-contained power supply, etc.

Original user-specific information is obtained from the original user while the original user is entering the location, and such is input to the machine reader potentially using the user interface, camera, scanner, etc. The machine reader stores an original code based on the original machine-readable data and the original user-specific information in the re-writeable electronic memory on the original admission ticket (e.g., using the wireless and wired communication components) while the original user is entering the location. The machine reader can perform an integrated or separate process of applying the original machine-readable data and original user-specific information to a hash function to calculate the original code and/or otherwise encrypting the original machine-readable data and the original user-specific information before storing the original code in the re-writeable electronic memory on the original admission ticket.

The original user is provided initial entry to the location after the storing the original code in the re-writeable electronic memory on the original admission ticket. The original admission ticket may be altered before the original user is provided initial entry to the location to indicate that the original admission ticket has been used to gain initial entry.

After the initial entry, a potential admission ticket is received at the location from a potential user (who may be the original user attempting to gain legitimate re-entry, or may be another user who is fraudulently using the real, or a fake, admission ticket). In order to determine whether the original user is attempting to gain legitimate re-entry using the original admission ticket, the machine reader optically reads the "potential" machine-readable data printed on the potential admission ticket at the location (e.g., using the scanner).

Also, potential user-specific information is obtained from the potential user while the potential user is entering the location. The original user-specific information and the potential user-specific information can be information from documents supplied by the original and potential users while the original and potential users were at the location (input to the user interface of the machine reader), physical descriptions of the original and potential users obtained while the original user were at the location (input to the user interface of the machine reader), biometric information of the original and potential users obtained (by biometric readers of the machine reader) while the users were at the location, photographs of the original and potential users obtained (by the camera of the machine reader) while the original and potential users were at the location, etc.

The machine reader compares the potential code (that is based on the potential machine-readable data and the potential user-specific information) to the original code stored in the re-writeable electronic memory on the original admission ticket while the potential user is entering the location. A match between the original code and the potential code determines if the original user and the potential user are the same and if the original admission ticket and the potential admission ticket are the same. The potential user is provided re-entry to the location only if the potential code matches the original code stored in the re-writeable electronic memory.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, re-entry control systems come with an array of advantages and disadvantages relating to materials cost, infrastructure cost, effectiveness, throughput, situational appropriateness, and flexibility. The systems and methods described herein replace hologram stickers or other security measures on the ticket with a printed memory device.

Re-entry control systems that utilize printed disposable admission tickets are subjected to tremendous cost pressures, and strong efforts are used to keep the cost of each printed ticket at a minimum. Therefore, rather than using relatively expensive radio frequency identification (RFID) devices, the systems and methods herein instead utilize inexpensive printed memory devices that are directly printed on (or adhered to) the admission tickets (or an inexpensive magnetic strip). Such relatively inexpensive printed memory devices only provide a small amount of re-writable memory (e.g. 25 bytes). Printed memory devices can be printed on the ticket or on an adhesive label that is attached to the ticket, and are accessible by electrical contact. Also, the printed memory devices used herein contain security features to prevent counterfeiting, unauthorized modification of data, or transfer of a label to a different ticket. Before use, the printed memory can be initialized to a state indicating that the ticket has been purchased and not used, possibly incorporating a hash of data (e.g., a data code) incorporated into the ticket by a data matrix, quick-reference (QR) code, 2-D barcode, or other machine-readable code. Upon entry to the venue, the ticket is matched to the attendee by acquiring some unique attribute from the person (e.g. the number from an ID document, or biometric data) and incorporating it into a hash, which is then written to the printed memory.

When the person reenters, the ticket is readily identified as used, and has been uniquely keyed to that individual. Privacy is maintained because the hash stored on the ticket cannot be decoded to recover the original unique attribute acquired from the attendee. The device used to process the ticket at the entry point does not always need to be connected to a central database. In some configurations, the systems and methods herein print a replacement ticket with an updated 2-D barcode, or print an additional barcode onto the ticket.

Figure 1:
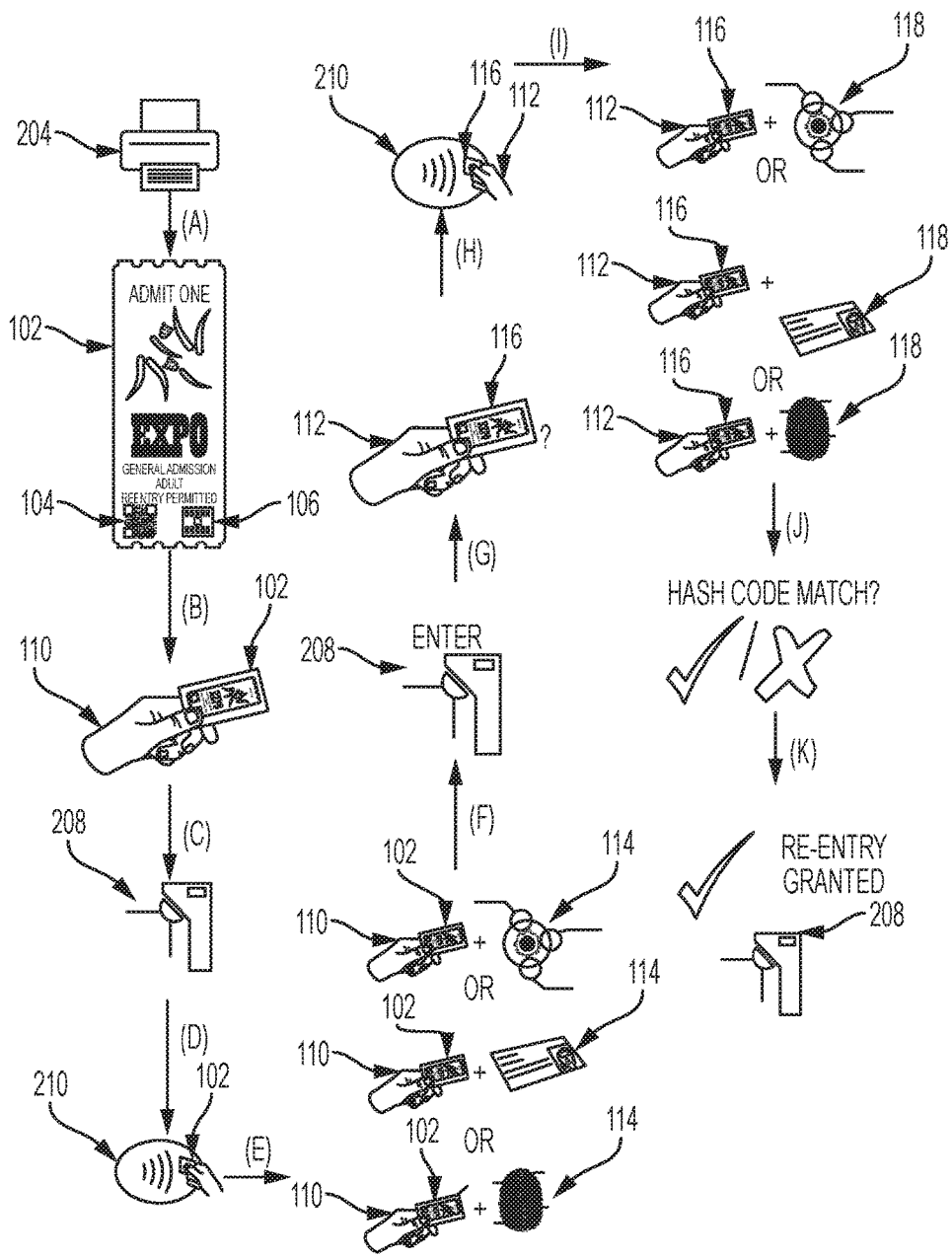
FIG. 1 is a schematic diagram illustrating operations of systems herein.

As shown in graphic form in FIG. 1, various exemplary systems herein include (among other components) at least one printing device 204 creating (e.g., printing, as shown by arrow A in FIG. 1) an original admission ticket 102 that includes printed machine-readable data 104 and a printed re-writeable electronic memory 106. The printed machine-readable data 104 can comprise any form of printed markings (bar codes, glyphs, QR codes, etc.) that contain data.

Printed re-writable electronic memory 106 is well-known to those ordinarily skilled in the art (as demonstrated by the discussion in U.S. Pat. No. 6,812,509 and documents that cite this patent) and generally involves using conventional printers (e.g., ink jet printers) to print patterns of conductive and insulating materials to form transistors, capacitors, wires, electrical contacts, etc. For example, one type of printable memory cell is a field effect organic transistor using a ferroelectric thin film polymer as gate dielectric. By controlling the gate voltage to polarize, the thin film ferroelectric polymer is polarized in either an "up" or "down" state, and the source-drain current can be controlled between two different values under the same source-drain voltage. The source-drain current thus can be used to represent either a "0" or "1" state. Such organic thin film semiconductors can be made by well-known processes such as ink jet printing, etc.

The original admission ticket 102 is issued (as shown by arrow B in FIG. 1) for user admission to an event at a location 208, and after issuance, the original admission ticket 102 is received (as shown by arrow C in FIG. 1) at the location 208 from an original user 110 for admission into the event.

Figure 5:
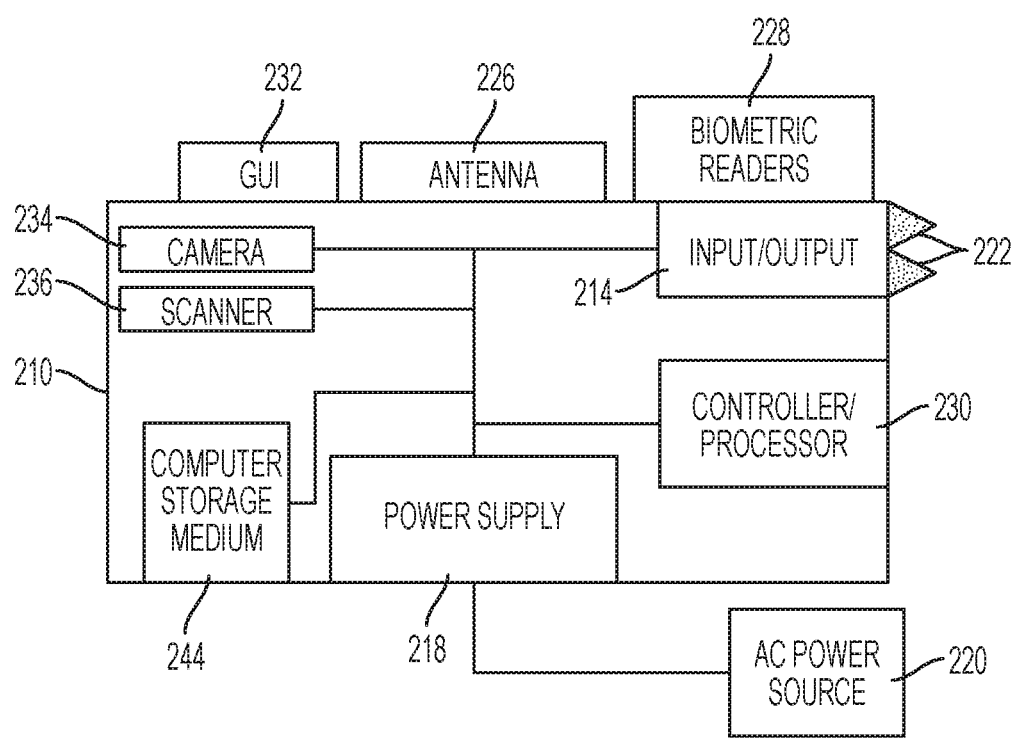
FIG. 5 is a schematic diagram illustrating devices herein.

A machine reader 210 is included in the system (at the location 208) for optically reading (scanning as shown by arrow D in FIG. 1) the original machine-readable data 104 on the original admission ticket 102, and is operated by an automated or manual entry gate agent to allow the user 110 to gain admission to the location 208. The machine reader 210 can be portable and can include (among other components, as shown in FIG. 5, discussed below) a processor 230, a memory 242, a user interface 232, a scanner 236 (optically reading the machine-readable data 104, etc.), biometric readers 238, a camera 234, contact probes 222, wireless and wired communication components 226, a self-contained power supply 218, etc.

As shown by arrow E in FIG. 1, original user specific 114 information is obtained from the original user 110 while the original user 110 is entering the location 208 and input to the machine reader 210, potentially using the user interface 232, camera 234, scanner 236, etc. For example, the original user specific 114 information can be information from documents (ID's, driver licenses, passports, etc.) supplied by the original user while the original user is at the location 208 (input to the user interface 232 of the machine reader 210), physical descriptions of the original user (e.g., height, hair color, gender, clothing color, distinguishing physical feature, etc.) obtained while the original user is at the location 208 (input to the user interface 232 of the machine reader 210), biometric information of the original user obtained (by biometric readers 238, etc., of the machine reader 210) while the user is at the location 208, photographs of the original user obtained (by the camera 234 of the machine reader 210) while the original user is at the location 208, etc.

As shown by the graphics between arrows E and F in FIG. 1, the machine reader 210 (or a network connected processor) creates an original code based on the original machine-readable data 104 and the original user specific 114 information, and stores the original code in the re-writeable electronic memory 106 on the original admission ticket 102 (e.g., using the wireless and wired communication components 226) while the original user 110 is entering the location 208. In one example, the machine reader 210 (or a network connected processor) can perform an integrated or separate process of applying the original machine-readable data and original user-specific information to a hash function to calculate the original code and/or perform other encrypting processes before storing the original code in the re-writeable electronic memory 106 on the original admission ticket 102.

The original user 110 is provided initial entry to the location 208 (as shown by arrow F in FIG. 1) after the storing the original code in the re-writeable electronic memory 106 on the original admission ticket 102. The original admission ticket 102 may be altered before the original user 110 is provided initial entry to the location 208 to indicate that the original admission ticket 102 has been used to gain initial entry.

After the initial entry, a potential admission ticket 116 is received at the location 208 from a potential user 112 (who may be the original user 110 attempting to gain legitimate re-entry, or may be another user who is fraudulently using the real, or a fake, admission ticket 116) as shown by arrow G in FIG. 1. In order to determine whether the original user 110 is attempting to gain legitimate re-entry using the original admission ticket 116, the machine reader 210 optically reads the "potential" machine-readable data 104 printed on the potential admission ticket 116 at the location 208 (e.g., using the scanner 236) as shown by arrow H in FIG. 1.

Also, potential user specific 118 information is obtained from the potential user 112 while the potential user 112 is entering the location 208 (as shown by arrow I in FIG. 1) and applied to the same hash function used to create the original code, to calculate a potential code, that is then compared to the original code to allow or deny admission to the potential user.

The type of potential user specific 118 information obtained is the same as the original user-specific information 114 that was previously obtained (to properly allow the original code to be compared to the potential code, by using the same type of user-specific information input to the same hash function). For example, in some situations the machine reader 210 instructs the gate entry agent which potential user-specific information 118 to obtain for each different event, so that all gate entry agents obtain the same type of information from all of those seeking admission. Alternatively, automated gate entry agents can instruct those seeking admission to all supply the same type of user-specific information (either by instructing attendees to manually enter such information into the user interface, or by instructing the users to operate specific biometric readers or other equipment of the machine reader 210 to obtain such user-specific information). In addition, for higher security, multiple types of user-specific information can be obtained, and the hash function may consistently select one or more of those types of user-specific information to apply to the hash function.

As shown by arrow J in FIG. 1, the machine reader 210 compares the potential code to the original code stored in the re-writeable electronic memory 106 on the original admission ticket 102, while the potential user 112 is entering the location 208. As shown by arrow K in FIG. 1, the potential user 112 is provided re-entry to the location 208 only if the potential code matches the original code stored in the re-writeable electronic memory 106.

Figure 2:
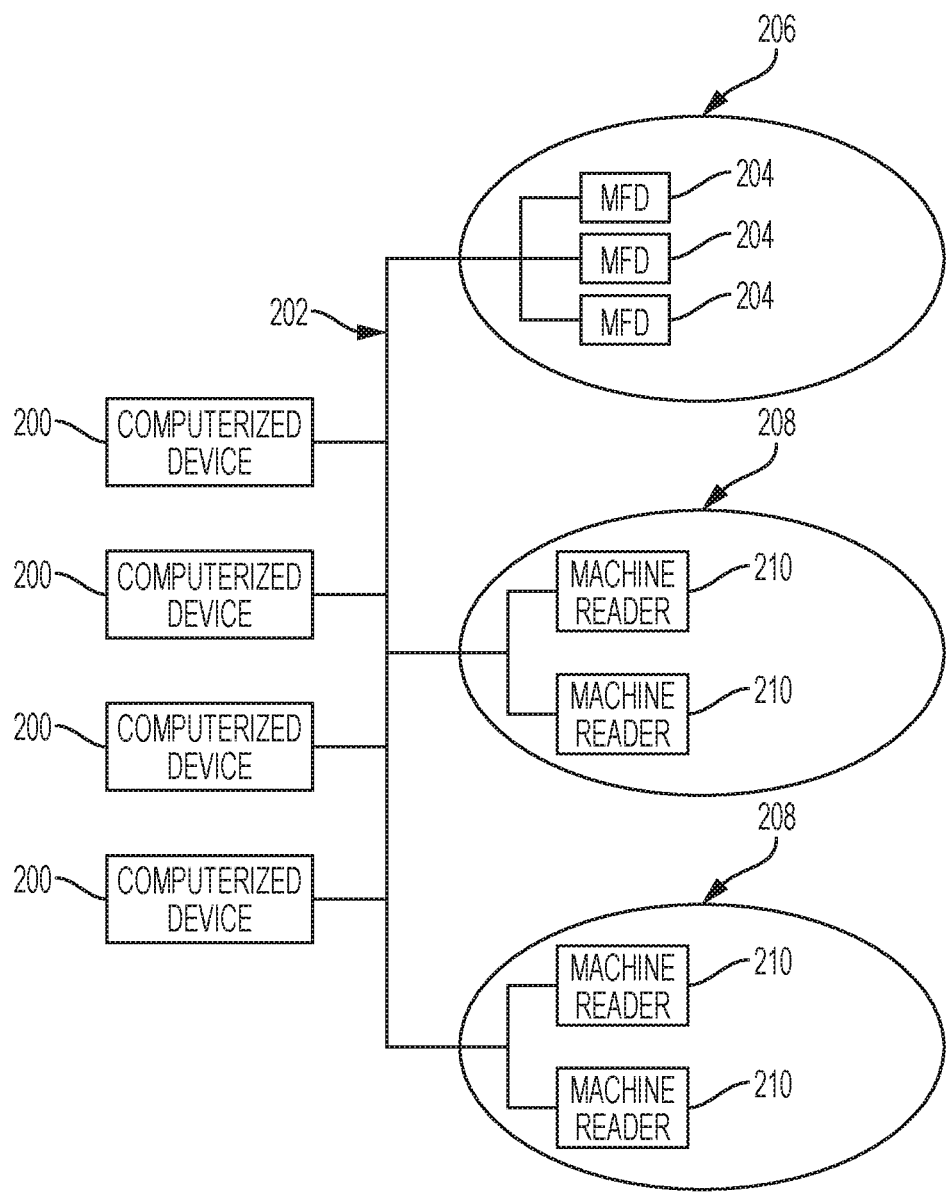
FIG. 2 is a schematic diagram illustrating systems herein.

As shown in FIG. 2, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202. Therefore, as shown in FIG. 2, the various processing described herein can be performed all on the machine reader 210 itself, or can be performed by many different devices 200 that are connected to the machine reader 210 by any form of network 202. In addition, a machine reader 210 at one location 208 can share any and all information obtained from the admission ticket 102, the user-specific information, the original code, etc., with all other computers 200 and all other machine readers 210 to allow the user to be readmitted at a different entry point or different entry location 208.

Therefore, the network 202 allows communication among devices to print the ticket or to exchange data with the machine readers before or after any event. One feature of the systems and methods herein is that the machine readers are not dependent on any sort of communication network when granting initial access or re-entry. Versions of systems herein with dependable communication among machine readers, or between machine readers and a central computer or computers, are able to match user-specific data and ticket data against a central or distributed database, obviating the need for memory integrated into the ticket.

Figure 3:
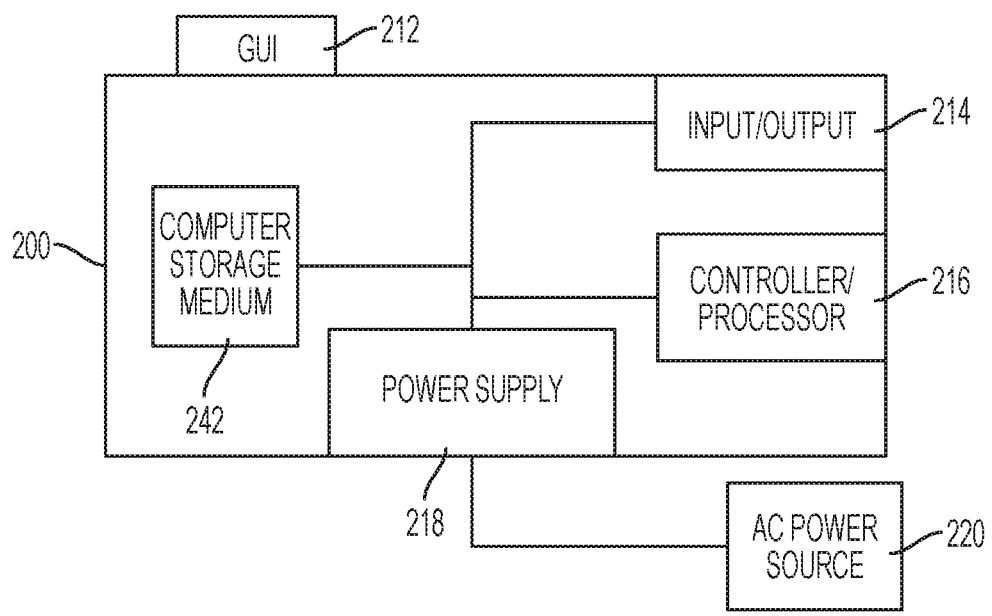
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 242 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc), etc.

Figure 4:
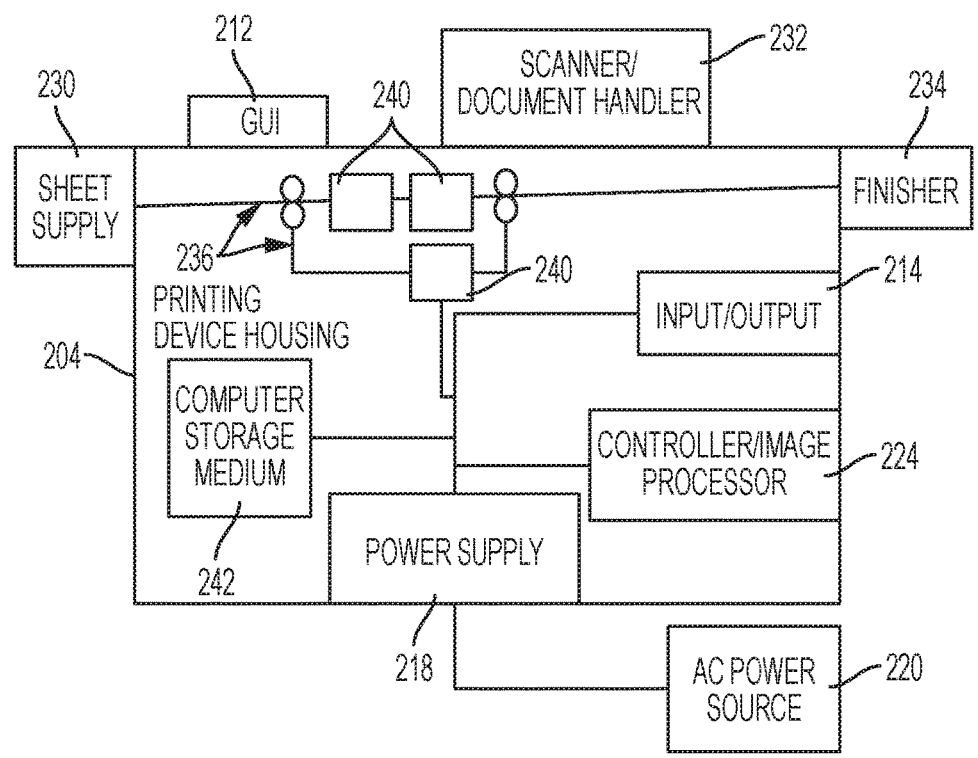
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.). The printing device 204 can be a device that prints standard inks and toners on print media, or can be a highly specialized printing device that prints memory. Printed memory is produced on specialized machines, which is one feature that contributes to its security. Therefore, the ticket can be printed concurrently with the printed memory using highly specialized manufacturing equipment; or the printed memory can be printed before the other printing of the ticket features and can, for example, be in the form of a self-adhesive sticker that is applied before or after the other ticket feature printing, or the printed memory could be pre-printed in a substrate upon which the later ticket feature printing occurs, to produce the ticket.

FIG. 5 illustrates one example of a machine reader 210, such as a portable computerized device, which includes many of the components mentioned above in FIG. 5 (and similar items are provided the same reference numeral in the drawings). The portable machine reader 210 shown in FIG. 5 can comprise, for example, a special-use device such as a smart phone, tablet, or other special-purpose portable computerized element that is easily carried by a gate entry agent. Such devices are special-purpose devices distinguished from general-purpose computers because such devices include specialized hardware, such as: specialized processors 230 (e.g., containing specialized filters, buffers, application specific integrated circuits (ASIC s), ports, etc.) that are specialized for processing admission tickets, for use with wireless networks, etc.; specialized graphic user interfaces 232 (that are specialized for reduced power consumption, reduced size, antiglare, etc., or are only usable for processing admission tickets as described herein); antenna 228 (that are specialized for processing admission tickets, etc.); specialized converters; contact probes 222; biometric readers 228; cameras 234 and optical scanners 236 (that are specialized for obtaining); specialized batteries; specialized protective cases for use in harsh environments; etc. The contact probes 222 make contact with the printed memory 106 on the ticket 102 in order to read from, and write to, the printed memory 106 on the ticket 102.

The various sets of instructions that are executed by a computerized processor to perform the methods described herein can be any form of computerized application, such as an API, a platform API workflow program, a specialty application, etc., all of which are referred to herein simply as "application" for shorthand.

Figure 6:
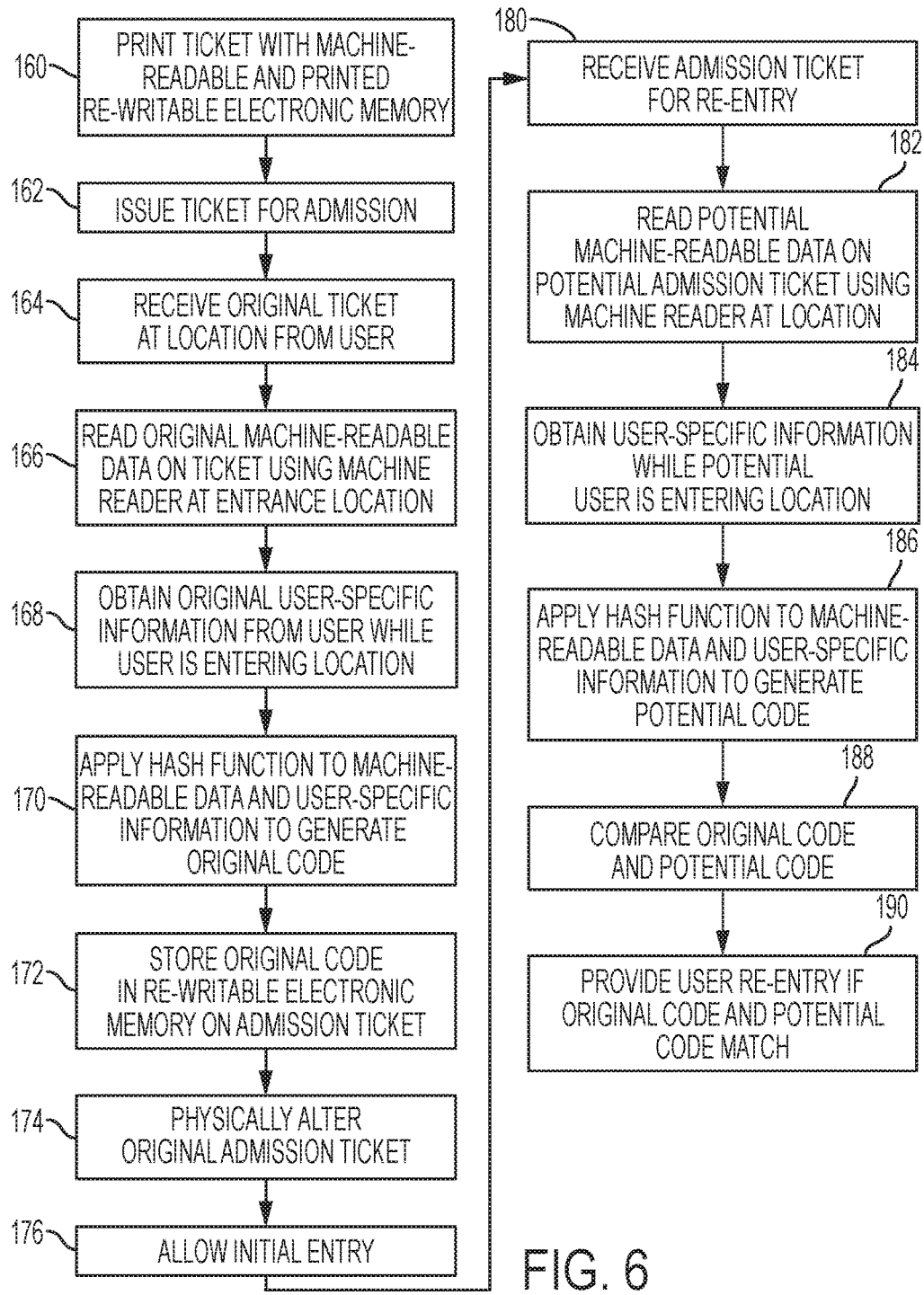
FIG. 6 is a flow diagram of various methods herein.

FIG. 6 is flowchart illustrating exemplary methods herein. In item 160, these methods create an original admission ticket that includes printed machine-readable data and a printed re-writeable electronic memory using at least one printing device. Subsequently, in item 162, such methods issue the original admission ticket for admission to a location where an event is occurring, and in item 164 such methods receive the original admission ticket at the location from an original user who desires admission to the event.

In item 166, these methods optically read original machine-readable data on the original admission ticket using a machine reader at the location. Additionally, in item 168, such methods obtain original user-specific information from the original user while the original user is entering the location. Then, in item 170, such methods create an original code by applying a mathematical function (e.g., hash function) to the original machine-readable data and the original user-specific information to produce a code, which is referred to herein as an original code.

While, in some situations, the machine-readable data and the user-specific information can be utilized, because of the limited size of the printed memory, it is sometimes better to calculate the original code, because the original code is much smaller in memory size (less bytes) and requires last memory, thereby allowing the less expensive printed memory to be easily utilized. Therefore in item 170, these methods perform an integrated or separate process of applying the original machine-readable data and original user-specific information to a hash function to calculate the original code and/or encrypting the original machine-readable data and the original user-specific information before storing the original code in the re-writeable electronic memory on the original admission ticket.

In item 172, such methods store the original code in the re-writeable electronic memory on the original admission ticket, using the machine reader while the original user is entering the location. After the storing the original code in the re-writeable electronic memory on the original admission ticket in item 172, these methods provide the original user initial entry to the location in item 176. In item 172, these methods can physically alter the original admission ticket before providing the original user initial entry to the location (in item 174) to indicate that the original admission ticket has been used to gain initial entry.

At some time after the initial entry, the original user may want to renter using the original admission ticket; however, the identity of the original user and the authenticity of the original admission ticket need to be verified. Therefore, in item 180, such methods receive the admission ticket that is submitted for re-entry at the location as a "potential" admission ticket until it is verified, and from the user who is also classified as a "potential" user until they are verified.

In such processing, these methods optically read potential machine-readable data on the potential admission ticket using the machine reader at the location in item 182, and obtain potential user-specific information from the potential user while the potential user is entering the location in item 184. The original user-specific information (obtained in item 168) and the potential user-specific information (obtained in item 184) is the same type of information and can, for example, be information from documents supplied by the original and potential users while they were at the location input to the machine reader, physical descriptions of the original and potential users obtained while the original user were at the location input to the machine reader, biometric information of the original and potential users obtained by the machine reader while the users were at the location, and photographs of the original and potential users obtained by the machine reader while they were at the location.

Then, in item 186, such methods create a potential code by applying a mathematical function (e.g., hash function) to the potential machine-readable data and the potential user-specific information to produce a code, which is referred to herein as an potential code. This allows the methods to compare the potential code to the original code stored in the re-writeable electronic memory on the original admission ticket using the machine reader while the potential user is entering the location in item 188. A match between the original code and the potential code determines if the original user and the potential user are the same and if the original admission ticket and the potential admission ticket are the same. Thus, in item 190 such methods provide the potential user re-entry to the location only if the potential code matches the original code stored in the re-writeable electronic memory.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine reading data from a ticket, processing data to create hash code, storing the original code in the printed memory. For example, if one were to manually attempt to perform the such processing, the manual process would be sufficiently inaccurate and take an excessive amount of time so as to render the manual classification results useless. Specifically, processes such as scanning machine-readable data, electronically storing memory, obtaining biometric data, etc., requires the utilization of different specialized machines, and humans performing such processing would not produce useful results. Thus, as would be understood by one ordinarily skilled in the art, the processes described herein cannot be performed by human alone (or one operating with a pen and a pad of paper) and instead such processes can only be performed by a machine.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user); one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:

at least one printing device having a printing engine capable of printing markings on print media to create an original disposable printed admission ticket that includes original machine-readable data and a printed re-writeable electronic memory initialized to an unused state indicating that said original disposable printed admission ticket has been purchased and not yet used, said original disposable printed admission ticket is issued for admission to an event location that is different from a printing location where said original disposable printed admission ticket is printed; and a machine reader at said event location, said machine reader has a scanner capable of optically reading said original machine-readable data on said original disposable printed admission ticket as said original disposable printed admission ticket is received at said event location from an original user, said machine reader has input components distinct from said scanner capable of obtaining original user-specific information from said original user while said original user is at said event location providing said original disposable printed admission ticket, said machine reader has a processor capable of creating an original code based on said original machine-readable data and original user-specific information, said machine reader has communication components capable of storing said original code in said printed re-writeable electronic memory on said original disposable printed admission ticket while said original user is being admitted to said event location to modify said printed re-writeable electronic memory from said unused state to a used state, said machine reader has a user interface capable of displaying an indication to provide said original user initial entry to said event location after said storing said original code in said printed re-writeable electronic memory on said original disposable printed admission ticket, said machine reader is capable of using said scanner to optically read potential machine-readable data on a potential admission ticket received at said event location from a potential user after said initial entry, said machine reader is capable of using said input components to obtain potential user-specific information from said potential user while said potential user is at to said event location providing said potential admission ticket after said initial entry, said machine reader is capable using said processor to create a potential code based on said potential machine-readable data and potential user-specific information, said machine reader is capable of using said processor to compare said original code stored in said printed re-writeable electronic memory on said original disposable printed admission ticket to said potential code while said potential user is at said event location seeking admission, and said machine reader is capable of using said user interface to display an indication to provide said potential user re-entry to said event location only if said potential code matches said original code stored in said printed re-writeable electronic memory.

2. The system according to claim 1, said original user-specific information and said potential user-specific information comprising at least one of information from documents supplied by said original user while said original user is at said event location input to said machine reader, physical description of said original user obtained while said original user is at said event location input to said machine reader, biometric information of said original user obtained by said machine reader while said original user is at said event location, and a photograph of said original user obtained by said machine reader while said original user is at said event location.

3. The system according to claim 1, said machine reader is capable of using said processor to:

apply said original machine-readable data and original user-specific information to a hash function to calculate said original code; and apply said potential machine-readable data and potential user-specific information to said hash function to calculate said potential code.

4. The system according to claim 1, said machine reader is capable of using said processor to find a match between said original code and said potential code to determine if said original user and said potential user are the same and if said original disposable printed admission ticket and said potential admission ticket are the same.

5. The system according to claim 1, said machine reader is capable of using said processor to encrypt said original machine-readable data and said original user-specific information before storing said original code in said printed re-writeable electronic memory on said original disposable printed admission ticket.

6. The system according to claim 1, said original disposable printed admission ticket is capable of being altered before said original user is provided initial entry to said event location to indicate that said original disposable printed admission ticket has been used to gain initial entry.

7. The system according to claim 1, said machine reader is portable and comprises biometric readers, a camera, wireless and wired communication components, and a self-contained power supply.

8. A system comprising:

at least one printing device having a printing engine capable of printing markings on print media to create an original disposable printed admission ticket that includes original machine-readable data and a printed re-writeable electronic memory initialized to an unused state indicating that said original disposable printed admission ticket has been purchased and not yet used, said original disposable printed admission ticket is issued for admission to an event location that is different from a printing location where said original disposable printed admission ticket is printed; and a portable machine reader at said event location, said portable machine reader has a scanner capable of optically reading said original machine-readable data on said original disposable printed admission ticket as said original disposable printed admission ticket is received at said event location from an original user, said portable machine reader has biometric readers capable of obtaining original user biometric information from said original user while said original user is at said event location providing said original disposable printed admission ticket for said admission to said event location, said portable machine reader has a processor capable of creating an original code based on said original machine-readable data and original user biometric information, said portable machine reader has communication components capable of storing said original code in said printed re-writeable electronic memory on said original disposable printed admission ticket while said original user is being admitted to said event location to modify said printed re-writeable electronic memory from said unused state to a used state, said portable machine reader has a user interface capable of displaying an indication to provide said original user initial entry to said event location after said storing of said original code in said printed re-writeable electronic memory on said original disposable printed admission ticket, said portable machine reader is capable of using said scanner to optically read potential machine-readable data on a potential admission ticket received at said event location from a potential user after said initial entry, said portable machine reader is capable of using said biometric readers to obtain potential user biometric information from said potential user while said potential user is at said event location, after said initial entry, said portable machine reader is capable using said processor to create a potential code based on said potential machine-readable data and said potential user biometric information, said portable machine reader is capable of using said processor to compare said original code stored in said printed re-writeable electronic memory on said original disposable printed admission ticket to said potential code while said potential user is at said event location seeking admission, and said portable machine reader is capable of using said user interface to display an indication to provide said potential user re-entry to said event location only if said potential code matches said original code stored in said printed re-writeable electronic memory.

9. The system according to claim 8, said original user-specific information and said potential user-specific information comprising at least one of information from documents supplied by said original user while said original user is at said event location input to said machine reader, physical description of said original user obtained while said original user is at said event location input to said machine reader, biometric information of said original user obtained by said machine reader while said original user is at said event location, and a photograph of said original user obtained by said machine reader while said original user is at said event location.

10. The system according to claim 8, said portable machine reader is capable of using said processor to:
apply said original machine-readable data and original user-specific information to a hash function to calculate said original code; and
apply said potential machine-readable data and potential user-specific information to said hash function to calculate said potential code.

11. The system according to claim 8, said portable machine reader is capable of using said processor to find a match between said original code and said potential code to determine if said original user and said potential user are the same and if said original disposable printed admission ticket and said potential disposable printed admission ticket are the same.

12. The system according to claim 8, said portable machine reader is capable of using said processor to encrypt said original machine-readable data and said original user-specific information before storing said original code in said printed re-writeable electronic memory on said original disposable printed admission ticket.

13. The system according to claim 8, said original disposable printed admission ticket is capable of being altered before said original user is provided initial entry to said event location to indicate that said original disposable printed admission ticket has been used to gain initial entry.

14. The system according to claim 8, said portable machine reader comprises a camera, and a self-contained power supply.

15. A method comprising:
printing markings on print media to create an original disposable printed admission ticket that includes original machine-readable data and a printed re-writeable electronic memory initialized to an unused state indicating that said original disposable printed admission ticket has been purchased and not yet used, using at least one printing device;
issuing said original disposable printed admission ticket for admission to an event location that is different from a printing location where said original disposable printed admission ticket is printed;
receiving said original disposable printed admission ticket at said event location from an original user;
optically reading said original machine-readable data on said original disposable printed admission ticket using a machine reader at said event location;
obtaining original user-specific information from said original user while said original user is at said event location;
creating an original code based on said original machine-readable data and said original user-specific information;
storing said original code in said printed re-writeable electronic memory on said original disposable printed admission ticket using said machine reader while said original user is being admitted to said event location to modify said printed re-writeable electronic memory from said unused state to a used state;
providing said original user initial entry to said event location after said storing said original code in said printed re-writeable electronic memory on said original disposable printed admission ticket;
after said initial entry:
receiving a potential admission ticket at said event location from a potential user;
optically reading potential machine-readable data on said potential admission ticket using said machine reader at said event location;
obtaining potential user-specific information from said potential user while said potential user is at said event location;
creating a potential code based on said potential machine-readable data and said potential user-specific information;
comparing said original code stored in said printed re-writeable electronic memory on said original disposable printed admission ticket to said potential code while said potential user is at said event location; and
providing said potential user re-entry to said event location only if said potential code matches said original code stored in said printed re-writeable electronic memory.

16. The method according to claim 15, said original user-specific information and said potential user-specific information comprising at least one of information from documents supplied by said original user while said original user is at said event location input to said machine reader, physical description of said original user obtained while said original user is at said event location input to said machine reader, biometric information of said original user obtained by said machine reader while said original user is at said event location, and a photograph of said original user obtained by said machine reader while said original user is at said event location.

17. The method according to claim 15, further comprising:
   applying said original machine-readable data and original user-specific information to a hash function to calculate said original code; and
   applying said potential machine-readable data and potential user-specific information to said hash function to calculate said potential code.

18. The method according to claim 15, said comparing determines if said original user and said potential user are the same and if said original disposable printed admission ticket and said potential admission ticket are the same.

19. The method according to claim 15, said storing said original code in said printed re-writeable electronic memory on said original disposable printed admission ticket comprises encrypting said original code before storing said original code in said printed re-writeable electronic memory on said original disposable printed admission ticket.

20. The method according to claim 15, further comprising physically altering said original disposable printed admission ticket before said providing said original user initial entry to said event location to indicate that said original admission ticket has been used to gain initial entry.

* * * * *